(12) United States Patent
Anton et al.

(10) Patent No.: US 8,425,971 B2
(45) Date of Patent: *Apr. 23, 2013

(54) EDIBLE OIL-AND-WATER EMULSION

(75) Inventors: Marc Joaquin Antoine Anton, Nantes Cedex (FR); Valérie Anne Marie Beaumal, Nantes Cedex (FR); Jadwiga Malgorzata Bialek, Vlaardingen (GB); Donald Joseph Hamm, Englewood Cliffs, NJ (US); Sudarshi Tanuja A Regismond, Vlaardingen (NL); Helga Françoise Sirvente, Dijon (FR)

(73) Assignee: Conopco, Inc., Englewood Cliff, NJ (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/004,777

(22) Filed: Dec. 21, 2007

(65) Prior Publication Data
US 2008/0254194 A1    Oct. 16, 2008

(30) Foreign Application Priority Data

Dec. 28, 2006  (EP) .................................... 06292060

(51) Int. Cl.
*A23D 7/00* (2006.01)
(52) U.S. Cl.
USPC ....................................................... 426/605
(58) Field of Classification Search ............ 426/605
See application file for complete search history.

(56) References Cited

U.S. PATENT DOCUMENTS

| | | | | |
|---|---|---|---|---|
| 3,224,883 A | * | 12/1965 | Pader et al. ........... | 426/116 |
| 3,944,680 A | * | 3/1976 | van Pelt et al. ........ | 426/564 |
| 6,010,734 A | * | 1/2000 | Whelan et al. ......... | 426/565 |
| 2005/0089621 A1 | * | 4/2005 | Aquino et al. .......... | 426/601 |
| 2006/0105093 A1 | * | 5/2006 | Bialek et al. ........... | 426/604 |

FOREIGN PATENT DOCUMENTS
EP          1254605 A1  * 11/2002

OTHER PUBLICATIONS

Belitz, H.D. and W. Grosch, Ed. "Food Chemistry"—Chapter 11.2—Structure, Physical Properties and Composition. 1999. 2nd Edition. Springer-Verlag Berlin Heidelberg Publisher. p. 519.*
Berchane, et al. "About mean diameter and size distributions of poly(lactide-co-glycolide) (PLG) microspheres." Journal of Microencapsulation. Aug. 2006, 23(5). 539-552.*
Mine. "Emulsifying characterization of hens egg yolk proteins in oil-in-water emulsions". Food Hydrocolloids, 12, 1998, 409-415.*
International Search Report, PCT/EP2007/063279, mailed Feb. 6, 2008, 4 pp.
European Search Report, EP 06 29 2060, dated May 31, 2007, 3 pp.
Aluko Rotimi E; Mine Yoshinori; "Competitive adsorption of hen's egg yolk granule lipoproteins and phosvitin in oil-in-water emulsions", Journal of Agricultural and Food Chemistry, vol. 45, No. 12, Dec. 1997, pp. 4564-4570, XP002435699.
JP 2001 078712 A (Knorr Shokuhin KK), Mar. 27, 2001, XP002435702, abstract.
JP 10 201426 (Taiyo Kagaku KK), Aug. 4, 1998, XP002435703, abstract.

* cited by examiner

*Primary Examiner* — D. Lawrence Tarazano
*Assistant Examiner* — J. A. Watts
(74) *Attorney, Agent, or Firm* — Ellen Plotkin

(57) ABSTRACT

The present invention relates to an edible water-continuous oil-and-water emulsion having a pH in the range of 2.0-5.0, said emulsion comprising:
  5-90 wt. % of an oil phase;
  10-95 wt. % of an aqueous phase;
  0.3-30% by weight of the aqueous phase of one or more egg yolk granule proteins selected from high density lipoprotein (HDL) and phosvitin; and
  from 0.05% up to 10 wt. % of the aqueous phase of one or more egg yolk plasma proteins selected from low density lipoprotein (LDL) and livetin;
  wherein the weight ratio of the egg yolk granule proteins to the egg yolk plasma proteins exceeds 1:1.

It was discovered that egg yolk granule proteins can advantageously be used to stabilize acidic water-continuous oil-and-water emulsions such as mayonnaise and dressings.

7 Claims, No Drawings

EDIBLE OIL-AND-WATER EMULSION

TECHNICAL FIELD OF THE INVENTION

The present invention relates to edible oil-and-water emulsions, especially oil-and-water emulsions that have been stabilised through the incorporation of egg yolk protein. Mayonnaise and dressings are typical examples of the oil-and-water emulsions encompassed by the present invention.

BACKGROUND OF THE INVENTION

Egg-yolk is widely used in a variety of prepared foodstuffs. Egg yolk is a very effective emulsifying agent and as such it is frequently applied to stabilise emulsified foods such as mayonnaises, dressings, sauces, soups, fat containing cake batters, (whippable) creams and ice cream.

Egg yolk contains a high level of fat and is itself an emulsion comprising a dispersion of oil droplets in a continuous aqueous phase. Hen's egg yolk has a total solid content of approximately 50 to 52% composed of 15.5 to 16.5% protein, 31.5 to 34.5% lipid, 0.5 to 1.5% carbohydrate and 0.9 to 1.2% ash. The egg-yolk lipids comprise as their main components approximately 65% triglyceride, 29% phospholipid and 5% cholesterol. Egg yolk protein consists of about 68% low-density lipoproteins (LDL), 16% high-density lipoproteins (HDL), 10% livetins and 4% phosvitins.

The high level of self emulsifying phospholipids makes egg yolk a very stable emulsion in addition to being an emulsifying agent. Besides phospholipids egg yolk contains other emulsifying agents, notably hydrophobic and hydrophilic proteins, and cholesterol. The aforementioned emulsifying agents are believed to interact during emulsion formation though the nature of such interactions has not fully been elucidated.

Egg yolk can be fractionated into a plasma and a granules fraction by diluting whole egg yolk with water or dilute aqueous saline solution followed by centrifugation to give a supernatant made up of plasma fraction (77-81 wt. % of yolk dry matter) and the precipitate that contains the granule fraction (19-23 wt. % of yolk dry matter). The plasma fraction of hen's egg yolk contains about 25% proteins and about 73% lipids, both calculated by weight of dry matter. The protein component of the plasma fraction represents about 80 wt. % of the yolk proteins and contains low-density lipoprotein (±85 wt. %) and the water-soluble globular protein livetin (±15 wt. %). The granule fraction of hen's egg yolk represents about 20 wt. % of the yolk proteins and typically contains about 64% protein and 31% lipids. The protein component of the granule fraction contains high density lipoprotein (±72 wt. %), phosvitin (±16 wt. %) and low density lipoprotein-g (±12 wt. %).

According to Anton et al. (J. Food Sc., volume 62, no. 3, 1997, 484-487), who carried out experiments in O/W emulsions (37.5 wt. % of oil) at neutral pH, at about 80% solubility, yolk, granules and plasma had similar emulsifying activities and granules had the best emulsion stabilisation. According to the authors, the results of their experiments suggest that granules could be used as stabilisers in food emulsions.

Traditional mayonnaise is an oil-in-water type emulsion comprising vegetable oil (70-80%), egg yolk (5-8%), salt, vinegar (to achieve a pH of the water phase of less than 4.2 to be considered an acid stable food), mustard, and optionally sugar, pepper and herbs. The oil is generally present in mayonnaise as a dispersed phase with an average droplet size of 3-8 μm. Because of the droplet size and the high amount of dispersed phase, mayonnaise contains a very close packing of oil droplets. The close packing of oil droplets, in combination with the very thin layer of aqueous phase separating said droplets, causes mayonnaise to exhibit a very desirable rheology that is perceived by consumers as a creamy thickness.

There is an ever-increasing demand for mayonnaise-type products having a lower content of oil but exhibiting the same sensorial properties and mouthfeel as full-fat mayonnaise. However, the lowering of the oil content of a standard mayonnaise-type formulation will result in a less dense packing of the oil droplets within the continuous aqueous phase. As a result, the thickness or viscosity of the emulsion will decrease dramatically. Thus, a reduced fat mayonnaise of inferior quality is obtained, e.g. a mayonnaise that is not spoonable. In fact if the oil phase is reduced below the critical packing level (~65% w/w), a conventional mayonnaise will become pourable.

It is known in the art to overcome the aforementioned viscosity decrease by adding thickeners, such as gums and/or starch, to the aqueous phase. The use of such thickeners, however, affects the taste and mouthfeel of the mayonnaise in unfavourable manner. The use of starch, for instance, usually leads to sticky, pasty products.

Another solution to the above problem is to rigorously decrease the size of the oil droplets. If the oil droplets are very small (e.g. less than 1 μm), and the amount of oil is not very low, this may yield an acceptable result. However, these very small droplets are very difficult to produce, i.e., extremely high shear needs to be applied during emulsification and additives are needed to stabilise the small droplets (the normal amount of 5-8% egg yolk will not be sufficient).

Therefore there is a need for alternative solutions that enable the preparation of stable spoonable mayonnaise products with decreased amounts of oil that have a smooth, thick mouth feel and like that of full fat mayonnaise.

SUMMARY OF THE INVENTION

The inventors have discovered that egg yolk granule proteins can advantageously be used to stabilise acidic water-continuous oil-and-water emulsions such as mayonnaise and dressings. Furthermore, it was found that by using egg yolk granule proteins a reduced fat mayonnaise can be prepared having rheological properties that closely resemble those of full fat mayonnaise. In addition to reduced oil mayonnaise, unexpectedly the egg yolk granule proteins can also be advantageously be used to stabilise other water-continuous oil-and-water emulsions.

The inventors have unexpectedly found that egg yolk granule proteins are a much more effective stabiliser of acidic oil-in-water emulsions, such as mayonnaise, than whole egg yolk. Although the inventors do not wish to be bound by theory, it is believed that whereas the proteins contained in the granule fraction of egg yolk are capable of stabilising acidified oil-in-water emulsions, the proteins contained within the egg yolk plasma fraction have, at best, a limited stabilising effect on these same emulsions.

One of the advantages offered by the present invention is that it obviates or at least reduces the need to use stabilisers like modified starch and gums like xanthan, gellan or guar gum. The use of additives like artificial stabilisers in products labelled "mayonnaise" is not allowed in some countries.

DETAILED DESCRIPTION OF THE INVENTION

Accordingly, one aspect of the invention relates to an edible water-continuous oil-and-water emulsion having a pH in the range of 2.0-5.0, said emulsion comprising:

5-90 wt. % of an oil phase;

10-95 wt. % of an aqueous phase;

0.3-30% by weight of the aqueous phase of one or more egg yolk granule proteins selected from high density lipoprotein (HDL) and phosvitin; and From 0.05 up to 10 wt. % of the aqueous phase of one or more egg yolk plasma proteins selected from low density lipoprotein (LDL) and livetin;

wherein the weight ratio of the egg yolk granule proteins to the egg yolk plasma proteins exceeds 1:1.

The term "egg yolk" as used herein refers to the yolk obtained from bird eggs, most preferably hen's eggs.

The term "high density lipoprotein" (HDL) as used herein refers to a protein-lipid complex that is found in substantial concentrations in birds egg yolk. HDL comprises a protein with a hydrophobic pocket that holds the lipid component. HDL contains 75-80% apoproteins and 20-25% lipids. These lipids are composed of 65% phospholipids, 30% triglycerides and 5% cholesterol. Two sub-groups of HDL can be separated by ion chromatography: $\alpha$ and $\beta$-HDL. $\alpha$-HDL contains 6 time more sialic acid and 2 times more phosphorus than $\beta$-HDL. Consequently, A-HDL is more acidic than $\beta$-HDL. Except for these differences, both types of HDL have similar chemical compositions. HDL has a molecular weight of approximately 400 kDa, a diameter of about 7-20 nm and a density of approximately 1.12 g/ml. Unlike LDL, HDL does not have a spherical structure, but its pseudo-molecular structure resembles that of globular proteins. Phospholipids contribute to stabilise the structure of HDL in water.

The term "low density lipoprotein" (LDL) as used herein refers to a globular complex that is a major component of birds egg yolk, said globular complex having a diameter of 17-60 nm and a density of about 0.982 g/ml. LDL comprises an inner core largely consisting of triglycerides and cholesteryl esters and a surface layer that mainly consists of phospholipids, cholesterol and apoproteins. The apoproteins represent 11-17 wt. % of LDL, the lipid components 83-89 wt. %. These lipids are composed of about 69% triglycerides, 26% phospholipids and 5% cholesterol. LDL is composed of 2 sub-groups: $LDL_1$ ($10.10^6$ Da) and $LDL_2$ (3.106 Da). $LDL_1$ represent 20% of total LDL and contains twice the amount of proteins as $LDL_2$. Chemical compositions of both types of LDL are similar. Proteins of LDL are composed of 6 apoproteins. The major apoprotein (130 kDa) accounts for more than 70% of the apoproteins. The second apoprotein represents about 20% of the apoproteins and its molecular weight is 15 kDa. Their isoelectric point is ranged from 6.5 to 7.3. Apoproteins of LDL contain about 40% of hydrophobic amino acids and present a random coil structure or a beta-sheet conformation. Consequently, they are highly hydrophobic and flexible molecules. Apoproteins of LDL are glycosylated on asparagyl residues and contain 1.3% of hexose, 0.67% of hexosamine and 0.38% of sialic acid.

The term "edible" as used herein means that the emulsion can be ingested and consumed in reasonable quantities without any toxic or other acute negative health effect. It will be understood therefore that the acidic emulsion of the present invention preferably does not contain any non-food grade additives.

As explained herein before, the invention resides in the recognition that the granule proteins contained within whole egg yolk are particularly effective in stabilising water-continuous water-and-oil emulsions. In whole hen's egg yolk the weight ratio of granular proteins (HDL and phosvitin) to plasma protein (LDL and livetin) is typically around 1:4. Thus, the present emulsions are characterised in that the egg yolk proteins employed contain substantially elevated levels of granular proteins. According to a particularly preferred embodiment, the weight ratio of the egg yolk granule proteins to the egg yolk plasma proteins within the emulsion exceeds 2:1, more preferably 4:1 and most preferably 9:1.

The benefits of the present invention are particularly pronounced in emulsions comprising from 30-90 wt. % of an oil phase and from 10-70 wt. % of an aqueous phase. Even more, preferably, the emulsion contains from 40-70 wt. % of an oil phase and from 30-60 wt. % of an aqueous phase. A typical representative of the latter type of emulsions is a reduced fat mayonnaise.

The oil phase contained in the present emulsion can suitably contain a variety of lipid ingredients such as triglycerides, diglycerides, monoglycerides, phospholipids and fat mimics such as sucrose polyesters. Preferably, triglycerides represent at least 80 wt. %, more preferably at least 90 wt. % and most preferably at least 95 wt. % of the oil phase. The oil phase components may be liquid at room temperature or they may be in crystalline form under ambient conditions. Preferably, at 20° C., the oil phase of the present invention contains less than 20 wt. %, more preferably less than 10 wt. % of solid fat. Most preferably, at the aforementioned temperature the oil phase contains no solid fat.

Especially preferred acidic emulsions include mayonnaise, dressings and savoury sauces. Most preferably, the acidic emulsion is a mayonnaise. Here the term "mayonnaise" also encompasses products that strictly speaking are not a mayonnaise (e.g. because they do not meet the legal definition of a mayonnaise) but which exhibit the properties that are typical of mayonnaise, notably spoonability and in-mouth lubrication.

The emulsions according to the present invention may comprise a dispersed or continuous oil phase. Preferably, the oil phase is a dispersed phase, in which case the present emulsion is an oil-in-water emulsion or a water-in-oil-in-water emulsion.

Typically, the present acidic emulsion comprises a dispersed oil phase having a mean diameter ($d_{3,2}$) in the range of 0.5-200 µm. As explained herein before the present invention enables the preparation of a stable acidic emulsion without the need of decreasing the oil droplet size to very low values, e.g. below 1 µm. At the same time it is preferred that the oil droplet size is small enough to prevent significant coalescence. Hence, according to a preferred embodiment, the emulsion comprises a dispersed oil phase having a mean diameter ($d_{3,2}$) in the range of 1-50 µm, more preferably in the range of 2-20 µm. The measurement of the particle size distribution is suitably performed using a laser diffraction based instrument (MASTERSIZER 2000). Samples are prepared by diluting 1 ml of sample with 9 ml of a 1% sodium dodecyl sulphate solution (SDS) (1:10) in order to deflocculate the oil droplets.

Before measuring, the sample is agitated for approximately 30 seconds and left out for 1 h. The measurements are performed directly after processing. The value of the Sauter mean diameter $d_{3,2}$ is calculated as follows:

$$d_{3,2} = \frac{\sum n_i d_i^3}{\sum n_i d_i^2}$$

Particularly good results have been achieved by the inventors by employing as egg yolk granule proteins an egg yolk granule fraction containing HDL and phosvitin in a weight ratio in excess of 1:1. Most preferably, the present emulsion contains HDL and phosvitin in a weight ratio within the range of 2:1 to 30:1.

Depending on the nature of the emulsion, the amount of egg yolk granule proteins needed to achieve sufficient stabilisation may vary widely. Preferably, the present emulsion contains 0.5-15%, most preferably 1-10% of egg yolk granule proteins by weight of the aqueous phase. As explained herein before, it is believed that egg yolk plasma proteins adversely affect the stabilising properties of the granule proteins. Consequently, according to a preferred embodiment the emulsion contains less than 3%, more preferably less than 1% and most preferably less than 0.5% of egg yolk plasma proteins by weight of the aqueous phase.

On the other hand, for obtaining optimal texture and firmness (in terms of Stevens value and mouth feel) of the emulsion of the invention, said emulsion contains at least 0.05%, preferably at least 0.1% by weight of the aqueous phase of one or more egg yolk plasma proteins selected from low density lipoprotein (LDL) and livetin.

The benefits of the present invention become especially manifest in emulsions with a pH in the range of 2.2-4.8, especially within the range of 2.5-4.5. A low pH not only means that the emulsion tastes sour, but also helps to prevent microbial spoilage. According to a preferred embodiment, the present emulsion is free of preservatives (acidulants not being regarded as preservatives).

The stabilising effect of egg yolk granule proteins is particularly prominent in acidic emulsions whose aqueous phase contains not more than a limited amount of dissolved salts. Accordingly, in a preferred embodiment, the ionic strength of the aqueous phase of the present emulsion does not exceed the ionic strength of an aqueous solution of 5 wt. % NaCl, more preferably it does not exceed the ionic strength of a 2 wt. % NaCl aqueous solution.

An important advantage of the present invention lies in the fact that the stabilising effect of the egg yolk granule proteins is reflected in an increased firmness of the emulsion. The firmness of an emulsion can be assessed by determining the so called Stevens value. Typically, the present emulsion has a Stevens value in excess of 20 g, more preferably in excess of 50 g. Usually the Stevens value of the emulsion does not exceed 400 g. The Stevens hardness, expressed in grams, is determined at 20° C. using a typical mayonnaise grid in a Stevens LFRA Texture Analyzer (ex. Stevens Advanced Weighing Systems, UK) with a maximum load/measuring range of 1000 grams and by applying a penetration test of 20 mm at 1 mm/s penetration rate. The mayonnaise grid comprises square openings of appr. 3×3 mm, is made up of wire with a thickness of app. 1 mm and has the following shape:

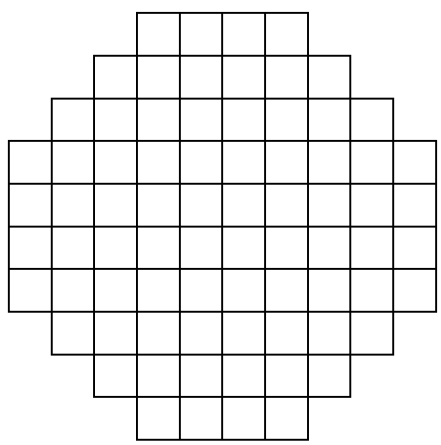 [SMILES: C1C2C3C4CC56CC78CC9%10CC%11C%12C%13CC%14%15CC%16%17CC%18%19CC%20C%21C%22CC%23%24CC%25%26CC%27%28CC%29C%30C%31CC%32%33CC%34%35CC1%36C21C32C45C34C67C56C98C78C%11%10C%129C%13%14C%10%11C%15%16C%12%13C%18%17C%14%15C%20%19C%21%16C%22%23C%17%18C%24%25C%19%20C%27%26C%21%22C%29%28C%30%23C%31%32C%24%25C%33%34C%26%27C%36%35C1%28C23C12C%28%26C3%26C%24%27C%24(C%23%25%21)C%22%19C%19%21C%17%20C%17(C%16%18%14)C%15%12C%12%14C%10%13C%10(C97%11)C85C5(C461)C23C(C%24%26%19)(C%105%12)C%17%21%14]

The acidic emulsion of the present invention, besides oil, water and egg yolk protein may suitably contain a variety of ingredients, such as food acids, flavouring materials and colourings. The emulsion may also contain other food additives such as EDTA. Examples of flavouring materials that may advantageously be incorporated in the present emulsion include sucrose, mustard, herbs, spices, lemon and mixtures thereof. According to a particularly preferred embodiment, the emulsion contains at least one of sucrose and mustard.

According to a particularly preferred embodiment the present emulsion has been acidified with one or more food acids selected from the group consisting of acetic acid, lactic acid, malic acid and citric acid. Most preferably, the emulsion has been acidified with acetic acid and/or citric acid.

The acidic emulsion according to the invention is preferably substantially free of artificial stabilisers selected from gums, modified and unmodified starches. Gums include gellan, xanthan, galactomannan (e.g. guar gum and locust bean gum), alginate, carrageenan, konjac mannan, microcrystalline cellulose, gelatin, agar, gum arabic, curdlan, chitosan and mixtures thereof. Substantially free in this respect means less than 1 wt. %, preferably less than 0.5 wt. %, more preferably less than 0.1 wt. % and most preferably less than 0.01 wt %.

Another aspect of the invention relates to a process for the manufacture of an emulsion as defined herein before in which water, oil and egg yolk granule proteins are combined and homogenised, followed by acidification and optionally another homogenisations step. More particularly, this aspect of the invention relates to such a process comprising the successive steps of:

combining water, oil, egg yolk granule proteins and optionally other food ingredients;

homogenising the combined ingredients to obtain a water-continuous oil-and-water emulsion, preferably an oil-in-water emulsion; and addition of an acidulant so as to decrease the pH of the emulsion by at least 1 point.

In order to homogenise the emulsion any suitable apparatus known to the person skilled in the art may be used.

Preferred means include colloid mills (e.g. ex Ross), high pressure homogenisers and inline homogenisers (e.g. ex. Maelstrom IPM).

The present emulsion may suitably be subjected to a heat treatment to increase the shelf life. Any heat treatment known in the art may be used such as pasteurisation, sterilisation, ultra high pressure and combinations thereof.

The invention is further illustrated by the following invention.

EXAMPLES

Example 1

Three mayonnaise products of reduced oil content were produced on the basis of the following recipes:

| Ingredient (wt %) | A | B | C |
|---|---|---|---|
| Undenatured egg yolk (liquid) [#] | 0.73 | — | — |
| Egg yolk granules [#] | — | 0.18 | — |
| Egg yolk plasma [#] | — | — | 0.55 |
| Undenatured egg white (liquid) [#] | 0.31 | 0.31 | 0.31 |

-continued

| Ingredient (wt %) | A | B | C |
|---|---|---|---|
| Salt | 1.09 | 1.09 | 1.09 |
| Sucrose | 1.25 | 1.25 | 1.25 |
| Lemon juice conc. | 0.058 | 0.058 | 0.058 |
| EDTA | 0.0077 | 0.0077 | 0.0077 |
| Oil | 65 | 65 | 65 |
| Water and Vinegar | remainder | remainder | Remainder |
| Total | 100 | 100 | 100 |

Concentrations indicated relate to egg protein

The egg yolk granules and egg yolk plasma were isolated from the same undenatured hen's egg yolk that was employed in the preparation of one of the mayonnaise products. The egg yolk was obtained by the following procedure:

Break the fresh eggs

Roll the egg yolk on a tissue until all of the egg white is removed

Puncture the egg yolk membrane with a glass pipette in order to release the egg yolk from the "envelope"

Collect the released egg yolk in a beaker.

The plasma and granules fraction were isolated from the whole yolk so obtained by diluting the yolk with an equal amount of aqueous NaCl solution (0.17 M NaCl), followed by mild-stirring for 1 hour. Next, the egg yolk suspension is centrifuged at 8,000 g and 10° C. for 30 minutes. After careful decanting of the supernatant, the supernatant is centrifuged again under the same conditions. The sediments so obtained are combined and washed 4 times (1 hour under stirring) with the NaCl solution, each washing step being followed by centrifugation under the aforementioned conditions. The combined sediments obtained after centrifugation represent the granules fraction and the combined supernatants the plasma fraction.

The mayonnaise products were prepared by dispersing all dry ingredients, the egg yolk component and egg white in water, adding the oil and mixing under medium shear to prepare the emulsion. The pH was checked and the appropriate level of acid (vinegar and lemon juice concentrate) was added at this stage. The emulsion was then homogenised using a colloid mill (Prestomill™) at 6000 rpm and a gap size of 0.25 (25°). The emulsions obtained after homogenisation were filled into jars and stored at ambient temperature. After several days of storage under ambient conditions the mayonnaise products were evaluated. The results of the evaluation were as follows:

|  | A | B | C |
|---|---|---|---|
| pH | 3.5 | 3.5 | 3.5 |
| Stevens value | 25 g | 88 g | 25 g |
| Consistency | pourable | Spoonable | pourable |
| Stability | unstable | Stable | unstable |

The results described above can also be obtained if instead of fresh egg yolk commercially available pasteurised hen's egg yolk is used as a starting material.

Example 2

Five mayonnaise products of reduced oil content were produced on the basis of the following recipes, using the same yolk ingredients as in Example 1:

| Ingredient (wt %) | A | B | C | D | E |
|---|---|---|---|---|---|
| Undenatured egg yolk (liquid) # | 1.2 | | | | |
| Egg yolk granules # | | 1.2 | 0.96 | 0.24 | |
| Egg yolk plasma # | | | 0.24 | 0.96 | 1.2 |
| Salt | 1.09 | 1.09 | 1.09 | 1.09 | 1.09 |
| Sucrose | 1.25 | 1.25 | 1.25 | 1.25 | 1.25 |
| Lemon juice conc. | 0.058 | 0.058 | 0.058 | 0.058 | 0.058 |
| EDTA | 0.0077 | 0.0077 | 0.0077 | 0.0077 | 0.0077 |
| Oil | 60 | 60 | 60 | 60 | 60 |
| Water and Vinegar | remainder | remainder | remainder | remainder | remainder |
| Total | 100 | 100 | 100 | 100 | 100 |

Concentrations indicated relate to yolk protein

The mayonnaise products were prepared in the same way as in Example 1, except that this time the emulsions were homogenised in a high pressure homogeniser (Niro Soavi's Panda 2K type NS1001L [max pressure 150 MPa, rated flow 10 dm³/h, internal chamber volume 12 cm³, impact head— code 190015]) at 200 bar.

Again, after several days of storage under ambient conditions the mayonnaise products were evaluated. The results of the evaluation were as follows:

|  | A | B | C | D | E |
|---|---|---|---|---|---|
| pH | 4.0 | 4.0 | 4.0 | 4.0 | 4.0 |
| Stevens value | 63 | 575 | 182 | 46 | 39 |
| Consistency | Slightly spoonable | spoonable | spoonable | pourable | Pourable |
| Stability | stable | stable | stable | unstable | Unstable |

The invention claimed is:

1. An edible water-continuous oil-and-water emulsion comprising:
    40-70 wt. % of an oil phase;
    30-60 wt. % of an aqueous phase;
    0.3-30% by weight of the aqueous phase of hen's egg yolk granule proteins selected from the group consisting of high density lipoprotein (HDL), phosvitin, and mixtures thereof; wherein said high density lipoprotein (HDL) and phosvitin are present in a weight ratio in excess of about 1:1; and from 0.05% up to about 3 wt. % of the aqueous phase of hen's egg yolk plasma proteins selected from the group consisting of low density lipoprotein (LDL), livetin, and combinations thereof;

wherein the weight ratio of the egg yolk granule proteins to the egg yolk plasma proteins exceeds 1:1;

wherein said emulsion has a pH of about 2.0 to 4.8;

wherein the emulsion comprises a dispersed oil phase comprising oil droplets having a mean diameter ($d_{3,2}$) in the range of 0.5-200 μm;

and wherein said emulsion has a Stevens hardness value of at least 50 g.

2. The emulsion according to claim 1, wherein the emulsion contains 0.5-15% of egg yolk granule proteins by weight, of the aqueous phase.

3. The emulsion according to claim 1, wherein the ionic strength of the aqueous phase does not exceed the ionic strength of an aqueous solution of 5 wt. % NaCl.

4. The emulsion according to claim 1, wherein the emulsion has been acidified with one or more food acids selected from the group consisting of acetic acid, lactic acid, malic acid and citric acid.

5. The emulsion according to claim 1, wherein the emulsion does not contain any non-food grade additives.

6. A process for the manufacture of an emulsion according to claim 1, said process comprising the successive steps of:

combining water, oil, egg yolk granule proteins and optionally other food ingredients;

homogenising the combined ingredients to obtain a water-continuous oil-and-water emulsion; and addition of an acidulant so as to decrease the pH of he emulsion by at least 1 point.

7. The emulsion according to claim 1, wherein the weight ratio of the egg yolk granule proteins to the egg yolk plasma proteins exceeds 2:1.

\* \* \* \* \*